United States Patent [19]
Marquardt et al.

[11] Patent Number: 5,918,893
[45] Date of Patent: Jul. 6, 1999

[54] SUBFRAME FOR A MOTOR VEHICLE

[75] Inventors: Ralf Marquardt, Wolfsburg; Wolfgang Teuber, Braunschweig, both of Germany

[73] Assignee: Volkswagen AG, Wolfsburg, Germany

[21] Appl. No.: 08/880,749

[22] Filed: Jun. 23, 1997

[30] Foreign Application Priority Data

Jun. 21, 1996 [DE] Germany .......................... 196 24 853

[51] Int. Cl.$^6$ ...................................................... B60G 7/00
[52] U.S. Cl. ..................................................... 280/124.109
[58] Field of Search ..................................... 280/124.109

[56] References Cited

U.S. PATENT DOCUMENTS

| | | | |
|---|---|---|---|
| 4,059,286 | 11/1977 | Otto et al. | 280/124.109 |
| 4,720,120 | 1/1988 | Shimatani et al. | 280/124.109 |
| 5,005,849 | 4/1991 | Gandiglio et al. | 280/124.109 |
| 5,104,142 | 4/1992 | Tsubota et al. | 280/124.109 |
| 5,411,285 | 5/1995 | Lee | 280/124.109 |

FOREIGN PATENT DOCUMENTS

| | | |
|---|---|---|
| 39 27 987 | 2/1991 | Germany . |
| WO/90/05083 | 5/1990 | WIPO . |

*Primary Examiner*—Kenneth R. Rice
*Attorney, Agent, or Firm*—Cohen, Pontani, Lieberman & Pavane

[57] ABSTRACT

A subframe for a motor vehicle, having a central part extending in the transverse direction of the vehicle and side parts with components for fixing the subframe to a vehicle body and holding arms for holding wheel control links.

The central part and the side parts are designed as separate components which are connected to one another.

13 Claims, 4 Drawing Sheets

SUBFRAME FOR A MOTOR VEHICLE

BACKGROUND OF THE INVENTION

1. Field of the Invention

The invention relates to a subframe for a motor vehicle.

2. Description of the Prior Art

A subframe of this kind is known from German reference DE 39 27 987 A1. Subframes are used in motor-vehicle construction in connection with independent suspension systems in order to increase the transverse rigidity of the relevant axle do that the forces associated with travel introduced via the vehicle wheels are borne well and do that there is good decoupling of the vehicle body from the wheels. The subframe generally extends between the wheels of one axle, having, at its outer end regions, holding arms for the articulated acceptance of the wheel control links and fixing arms for the attachment of the subframe to the vehicle body via rubber-metal supports.

Since the subframe must be matched precisely to the characteristics of the vehicle, in particular the wheel base and the weight of the vehicle, a conventional subframe such as that disclosed in DE 39 27 987 A1 or WO 90/05083 can only be used for a single vehicle type, so that the reduction in costs attempted in modern motor vehicle construction by the use of identical, standardized components in large numbers for different models has hitherto not been possible. The hitherto known one-piece subframes furthermore do not allow the use of different materials for the various parts of the subframe, so that partial use of light alloy in combination with steel has up to now been possible only with difficulty.

SUMMARY OF THE INVENTION

The object on which the invention is based is to provide a subframe that is economical to manufacture using standardized parts that can be used in different motor vehicle types.

Pursuant to this object, and others which will become apparent hereafter, one aspect of the present invention resides in a subframe that is comprised of a central part that extends in a transverse direction of the vehicle, side parts which are separate from the central part, and means for connecting the side parts to the central part. The side parts to which the fixing means for fixing the subframe to the vehicle body and the holding means for holding the wheel control links are attached, and the central part connecting the side parts are thus designed as separate components which are connected to one another by way of the connecting means. Although the multi-part design of the subframe requires a corresponding production step of assembling the separate components, even conventional subframes are often produced merely by welding together individual ready-made components, so that, even here, a corresponding production step is necessary. The multi-part arrangement according to the invention allows a modular construction in which only those parts of the subframe which are specific to the respective vehicle model have to be specially designed. Thus, a central part which is matched to the respective vehicle model, particularly as regards track width and vehicle weight, and which is produced specially for the respective vehicle model can be used with standardized side parts which are the same for various vehicle models and can thus be made in large numbers. In another embodiment of the invention the connecting means includes corresponding holes in the central and the side parts and bolts which pass through the holes to connect the components together.

The connecting means can simultaneously be used to fix the steering gear to the central part, with the result that an additional production step for the attachment of the steering gear is not necessary. The feature use according to the invention of a central part and two separate side parts allows the use of different materials for producing the central part and the side parts.

BRIEF DESCRIPTION OF THE DRAWINGS

The invention is explained in greater detail below by means of an embodiment, with reference to the attached drawings, in which.

DETAILED DESCRIPTION OF THE PREFERRED EMBODIMENTS

Figure 1:
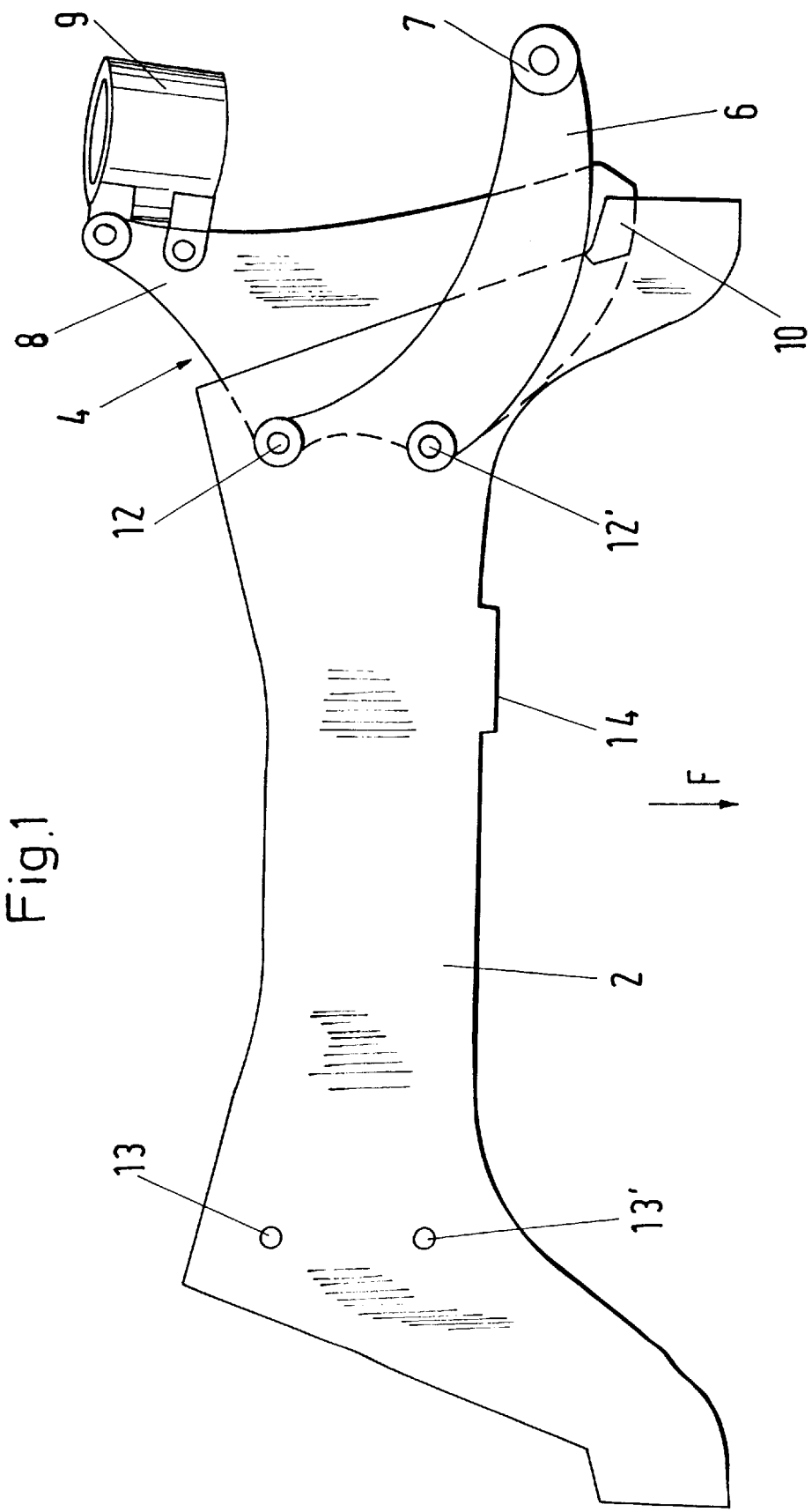
FIG. 1 shows a plan view of part of the subframe according to the invention.

A subframe has a central part 2 in which holes 13,13' are provided in the lateral end regions and brackets 4 are secured rigidly in these holes 13,13' by means of bolts 12, 12. For the sake of simplicity, only the right-hand bracket 4 is shown in FIG. 1. The bracket 4 has a holding arm 8 with a transverse-link support component 9 at the rear in relation to the direction of travel F of the vehicle, and a transverse-link support component 10 at the front. The link support components 9, 10 are each configured to hold a transverse wheel control link 18a, 18b, respectively, that serves to guide the wheel. The support component holds the link such that a pivoting axis of the transverse link extends essentially parallel to the direction of travel F.

To attach the subframe to the vehicle body, the bracket 4 has a fixing arm 6 with a bearing component 7, which forms part of a rubber-metal bearing.

Figure 2:
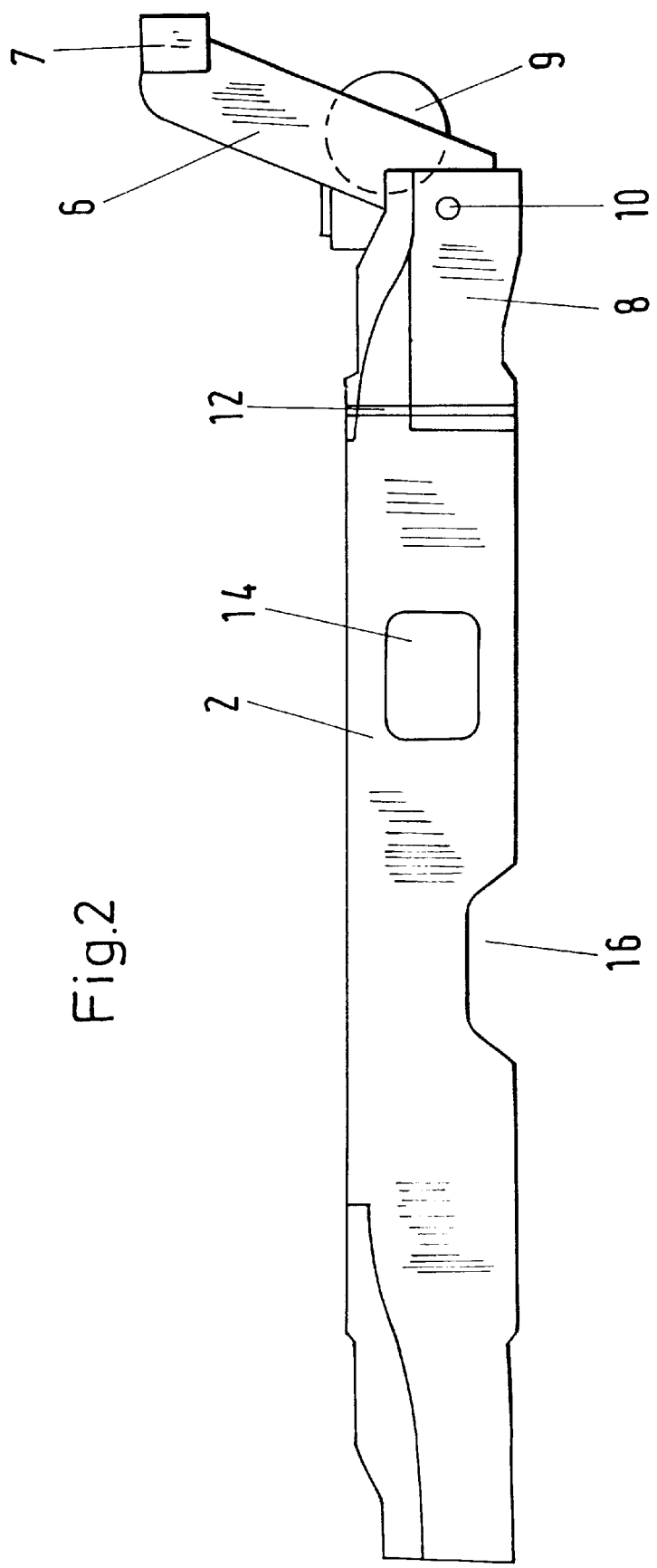
FIG. 2 shows a rear view of the subframe shown in FIG. 1.
Figure 3:
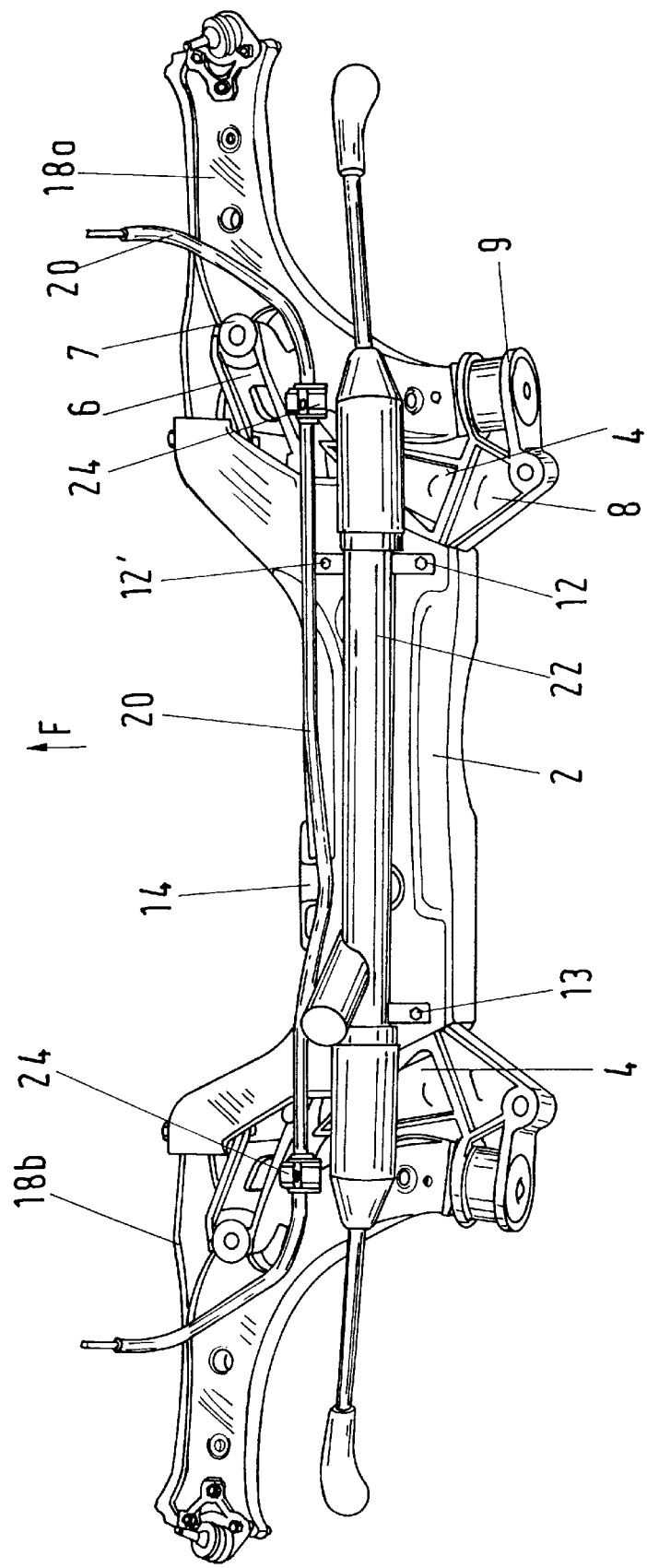
FIG. 3 shows a plan view of a running-gear arrangement with a subframe in accordance with FIG. 1, a mounted steering gear and attached transverse links.

As can be seen from FIG. 2 and 3, the fixing arm 6 is raised relative to the central part 2, with the result that the central part 2 and the holding arms 8 are accordingly spaced from the vehicle body in the vertical direction of the vehicle.

A cut-out 14 for a hinged support extending in the longitudinal direction of the vehicle and a recess 16 for an exhaust-pipe guide can be made in the central part 2. Appropriate depressions for holding an auxiliary unit, for example, can furthermore be present on the central part 2.

The central part 2 and the brackets 4 can be manufactured from a single material, e.g. steel or a light alloy such as, for example, aluminum or magnesium. As an alternative, the central part 2 and the bracket 4 can be made from different materials, it being possible, for example, for the central part 2 to be made of steel and the brackets 4 to be made from a light alloy such as, for example, aluminum or magnesium or an aluminum or magnesium alloy.

Figure 4:
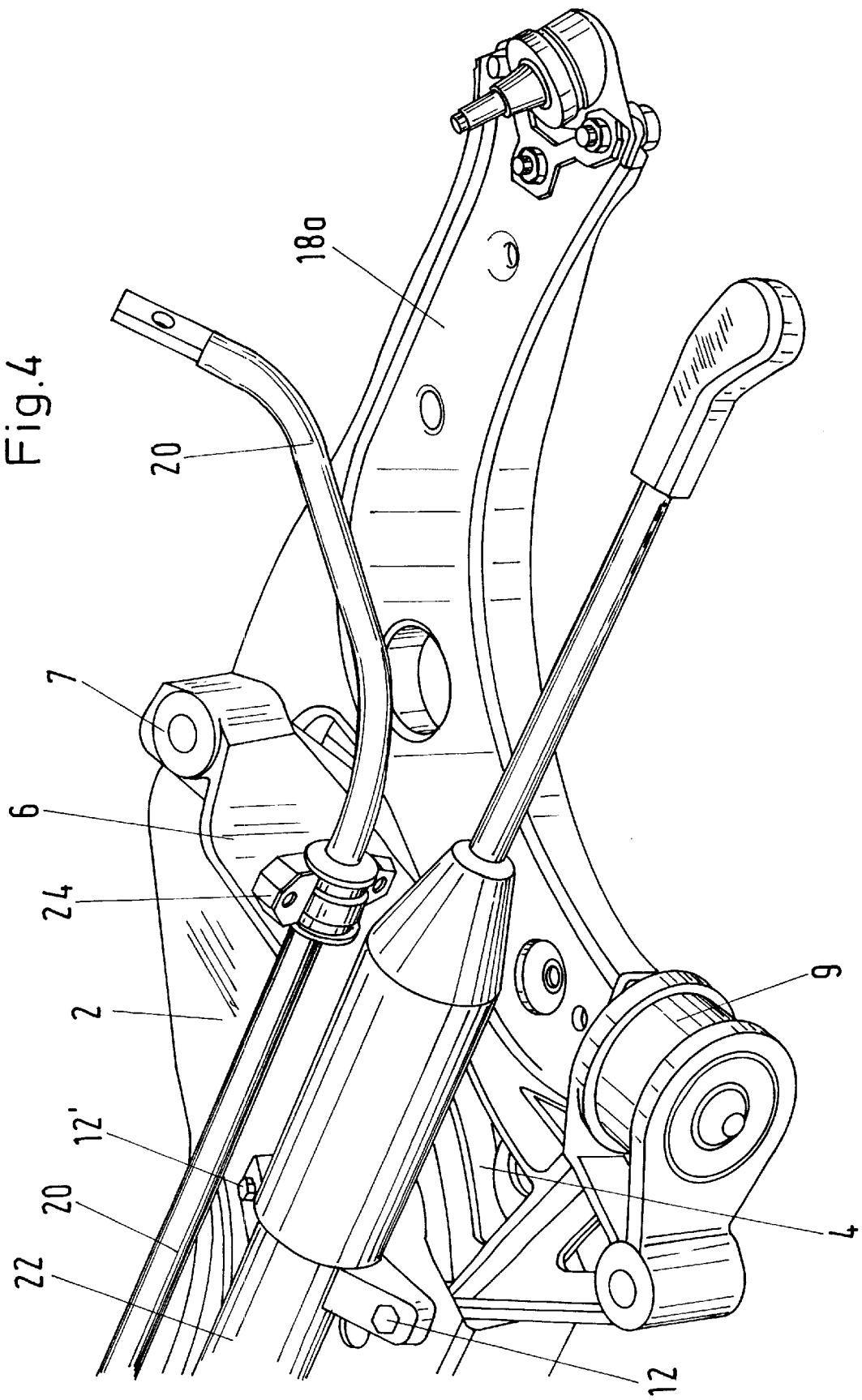
FIG. 4 shows a perspective view of an excerpt from FIG. 3.

According to FIGS. 3 and 4, a steering-gear housing 22 can be attached to the subframe. The steering-gear housing 22 can advantageously be attached by means of the same bolts 12, 12' and holes 13, 13' used to connect the central part 2 to the side brackets 4. This makes possible economical manufacture, during which the brackets 4, the central part 2 and the steering-gear housing 22 can be assembled in one operation by screwing in bolts 12, 12'. Thus, the outlay for production relative to a conventional subframe, to which the steering-gear housing must likewise be attached, is not increased by the use of a three-part subframe.

An antiroll bar 20 can be held by bushings or brackets 24 on the brackets 4. The bushings 24 are preferably arranged on the holding arms 6, and the central part 2 is thus uniform for all antiroll bars.

We claim:

1. A subframe for a motor vehicle, comprising: a central part that extends in a transverse direction of the vehicle; side parts, the side parts and the central part being separate components; means for connecting the side parts to the central part; means mounted on the side parts for fixing the subframe to a vehicle body; and holding means mounted to the side parts for holding wheel control links.

2. A subframe according to claim 1, wherein the connecting means includes holes in the central part and insertion members inserted into the holes so as to connect the side parts to the central part.

3. A subframe according to claim 2, wherein the connecting means includes holes in the side parts corresponding to the holes in the central part, the insertion members being bolts that pass through the holes to connect the side parts to the central part.

4. A subframe according to claim 1, and further comprising a steering-gear housing mounted to the central part.

5. A subframe according to claim 4, wherein the connecting means is configured to connect the steering-gear housing to the central part.

6. A subframe according to claim 1, wherein a cut-out is formed in the central part into which a hinged support extending essentially in a longitudinal direction of the vehicle is mountable.

7. A subframe according to claim 1, wherein a recess is arranged in the central part as a guide for an exhaust-pipe.

8. A subframe according to claim 1, wherein the central part is configured to have a depression in which an auxiliary unit is acceptable.

9. A subframe according to claim 1, wherein the central part and the side parts are made of different materials.

10. A subframe according to claim 9, wherein the central part is made of steel and the side parts are made of a light metal.

11. A subframe according to claim 10, wherein the side parts are made of one of aluminum, magnesium, an aluminum alloy, and a magnesium alloy.

12. A running-gear arrangement, comprising: a subframe having a central part that extends in a transverse direction of the vehicle, side parts, the side parts and the central part being separate components, means for connecting the side parts to the central part; means mounted on the side parts for fixing the subframe to a vehicle body; holding means mounted to the side parts for holding wheel control links; and a steering-gear housing mounted to the central part.

13. A running-gear arrangement according to claim 12, wherein the connecting means are configured to connect the steering-gear housing to the central part, as well as the central part to the side parts.

* * * * *